(12) United States Patent
Kamath

(10) Patent No.: US 12,022,801 B2
(45) Date of Patent: *Jul. 2, 2024

(54) DOG TRAINING DEVICE

(71) Applicant: Prakash R. Kamath, Charlottesville, VA (US)

(72) Inventor: Prakash R. Kamath, Charlottesville, VA (US)

(*) Notice: Subject to any disclaimer, the term of this patent is extended or adjusted under 35 U.S.C. 154(b) by 225 days.

This patent is subject to a terminal disclaimer.

(21) Appl. No.: 17/497,445

(22) Filed: Oct. 8, 2021

(65) Prior Publication Data

US 2022/0022422 A1    Jan. 27, 2022

Related U.S. Application Data

(63) Continuation-in-part of application No. 16/588,087, filed on Sep. 30, 2019, now Pat. No. 11,140,871.

(60) Provisional application No. 62/734,598, filed on Sep. 21, 2018.

(51) Int. Cl.
*A01K 15/02* (2006.01)
*A01K 27/00* (2006.01)

(52) U.S. Cl.
CPC ............ *A01K 15/02* (2013.01); *A01K 27/003* (2013.01)

(58) Field of Classification Search
CPC .... A01K 15/02; A01K 27/005; A01K 27/001; A01K 27/002; A01K 27/003
See application file for complete search history.

(56) References Cited

U.S. PATENT DOCUMENTS

| | | | | |
|---|---|---|---|---|
| 2,534,727 A * | 12/1950 | Moyle | ..................... | A01K 15/04 119/818 |
| 4,528,944 A * | 7/1985 | Reed | ...................... | A01K 15/04 119/702 |
| 6,354,247 B1 * | 3/2002 | Andrews | .............. | A01K 27/002 119/818 |
| 2005/0087149 A1 * | 4/2005 | Hodl | ........................ | A61D 9/00 119/818 |
| 2005/0103283 A1 * | 5/2005 | Penzak | ................... | A01K 15/04 119/816 |
| 2010/0122667 A1 * | 5/2010 | Horgan | ................ | A01K 27/002 119/856 |
| 2013/0152873 A1 * | 6/2013 | VerHoef | ................ | A01K 15/02 119/726 |
| 2018/0332826 A1 * | 11/2018 | Aiton | ..................... | A01K 15/00 |

* cited by examiner

*Primary Examiner* — Trinh T Nguyen
(74) *Attorney, Agent, or Firm* — Dickinson Wright PLLC

(57) ABSTRACT

Devices and system are provided that can not only stop a pet from pulling its owner, but to train a pet over time to not pull while being walked on a leash. In an exemplary implementation, a removable strap can be wrapped around the highest point of either front leg of a pet, and running a leash through the guide on the outside of the strap, so that an existing leash can be run from the collar, under the inside of the leg and up to the owner's hand.

9 Claims, 7 Drawing Sheets

DOG TRAINING DEVICE

CROSS-REFERENCE TO RELATED APPLICATIONS

This application is a continuation-in-part of U.S. patent application Ser. No. 16/588,087, filed Sep. 30, 2019, which claims priority to prior U.S. Provisional Patent Application No. 62/734,598, filed Sep. 21, 2018, the entire contents of both of which is incorporated herein by reference.

BACKGROUND

1. Field of Disclosure

The present disclosure relates to devices for training and/or controlling domestic animals and pets, and in particular dogs.

2. Description of Related Art

Conventional dog training devices, such as choke collars and muzzle collars may require excessive force by the trainer to be effective and/or cause excessive discomfort to the dog. Furthermore, such devices may require custom or specially designed leashes of collars that may not be usable other than for training purposes.

Accordingly, there is a need for a device or system that can be used with conventional leashes and/or collars, and/or address at least the above-noted drawbacks of conventional training or control devices.

SUMMARY OF THE DISCLOSURE

Exemplary embodiments of the present disclosure address at least these needs by providing a training device and system including a strap attachable to a front leg of a pet, and a guide configured with respect to the strap and the front leg of the pet for passing therethrough a leash attached to a collar worn by the pet, whereby the leash is within the guide disposed between a handle of the leash and the collar, and the leash is removably attached to the front leg of the pet at the guide.

According to an exemplary implementation of the disclosed embodiments, at least one of the guide and the strap achieves detachment from the leg of the pet when force between the handle of the leash and the collar exceeds a predetermined amount.

According to another exemplary implementation of the disclosed embodiments, the strap can comprise a hook and loop fastener to facilitate said detachment from the leg of the pet.

According to yet another exemplary implementation of the disclosed embodiments, the device and system can comprise a base configured with respect to said strap, wherein the guide comprises a removable attachment to said base to facilitate said detachment from the leg of the pet.

According to still further exemplary implementation of the disclosed embodiments, the predetermined amount of force can be set based on at least one of the size and weight of the pet.

According to another exemplary embodiment, a training device comprises a strap attachable to a front leg of a pet, and a guide configured with respect to the strap and the front leg of the pet for passing therethrough a leash attached to a collar worn by the pet, whereby the leash is within the guide disposed between a handle of the leash and the collar, and the strap is removably attached to the front leg of the pet. The strap achieves detachment from the leg of the pet when force between the handle of the leash and the collar exceeds a predetermined amount.

According to an exemplary implementation of other disclosed embodiment, the strap can comprise a releasable fastener to facilitate the detachment of said strap from the leg of the pet.

According to another exemplary implementation of other disclosed embodiment, wherein the strap further comprises a base and the guide is fixedly attached to the base.

According to yet another exemplary implementation of other disclosed embodiment, the training device comprising a protrusion disposed with respect to at least one of the strap and the guide configured to apply pressure to a body of the pet proportional to the force between the handle of the leash and the collar. For example, the protrusion can be disposed on the guide such that, when the strap is configure on the front leg of the pet, the protrusion is between the front leg and the body of the pet.

According to still another exemplary implementation of other disclosed embodiment, the guide comprises a loop attached to the base of the strap such that, when the strap is configure on the front leg of the pet, the loop is between the front leg and the body of the pet. The loop can be flexible.

According to yet further exemplary implementation of other disclosed embodiment, the guide comprises a loop attached to the strap such that, when the strap is configure on the front leg of the pet, the loop is between the front leg and the body of the pet, and the protrusion is disposed on the loop.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

The matters defined in the description such as a detailed construction and elements are provided to assist in a comprehensive understanding of the embodiments of the disclosure and are merely exemplary. Accordingly, those of ordinary skill in the art will recognize that various changes and modifications of the embodiments described herein can be made without departing from the scope and spirit of the disclosure.

Exemplary embodiments of the present disclosure will now be described in detail with reference to the annexed drawings. In the following description, a detailed description of known functions and configurations incorporated herein has been omitted for clarity and conciseness. Specific dimensions of various components provided in, or implied by, the drawings are to facilitate understanding of exemplary embodiments of the present disclosure.

Figure 1:
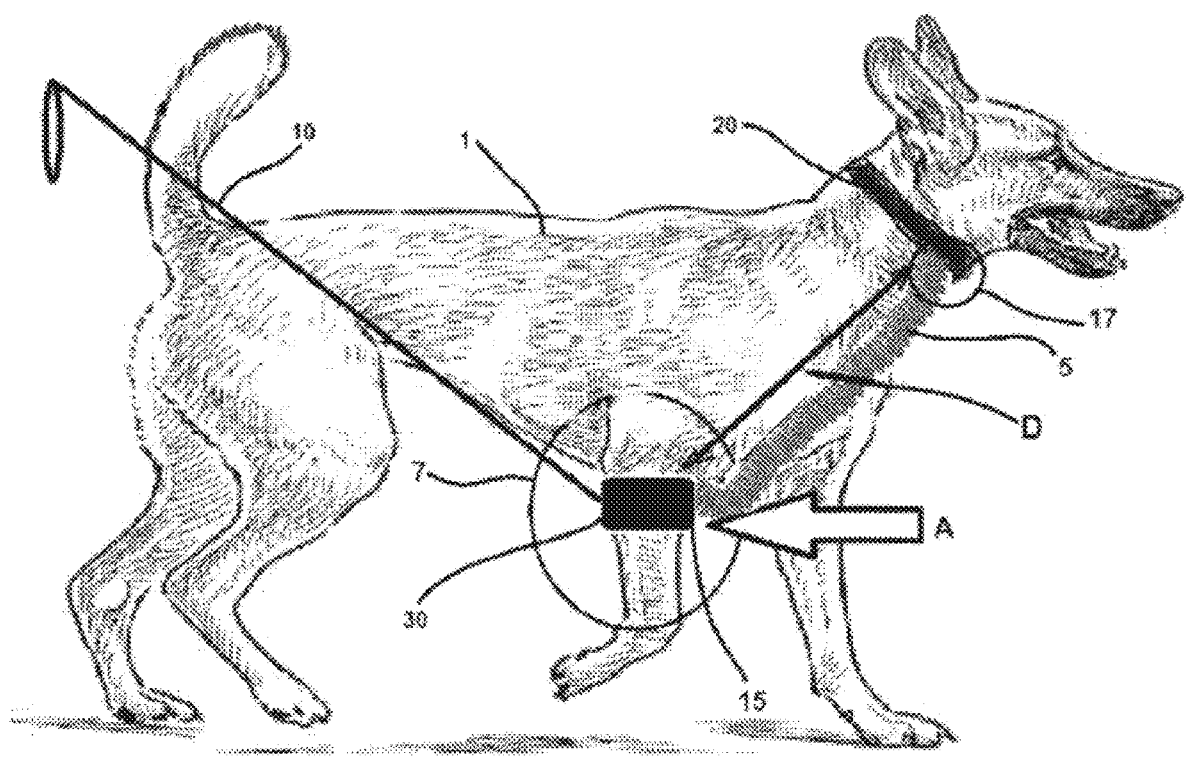
FIG. 1 is a generalized illustration of a device and system according to an exemplary embodiment of the disclosure disposed on a pet.

Referring to FIG. 1, exemplary embodiments of the present disclosure provide devices and system that can not only stop a dog from pulling its owner, but to train a dog over time to not pull while being walked on a leash. In an exemplary implementation, a cuff 30 can be wrapped around the highest point of either front leg of the dog, using, for example a hook and loop fastener and running a leash 10 through the sleeve or guide 60 on the outside of the cuff 30, so that an existing leash 10 can be run from the collar 20, under the inside of the leg and up to the owner's hand.

In an exemplary implementation, when the dog lunges or pulls, the dog's front leg is lifted, placing pressure on the dog's "armpit," causing the dog to lose leverage and naturally stop pulling.

According to an exemplary, non-limiting implementation, a detachable configuration, such as a tear-away, or releasable, hook and loop fastener, can create a "safety valve" that releases when the strength of the dog's pull creates a risk of injury. Exemplary implementations can provide for different strengths (sizes), based on the strength (weight) of the dog and correlating directly with the strength of the hook and loop.

According to an exemplary, non-limiting implementation of a detachable configuration, the cuff can be attached using a hook and loop fastener such that the ability to "break away" (release) if there is a risk of the dog pulling so hard it may injure itself, still leaves the leash connected to the collar and the other end of the leash still in the owner's hand.

Figure 2:
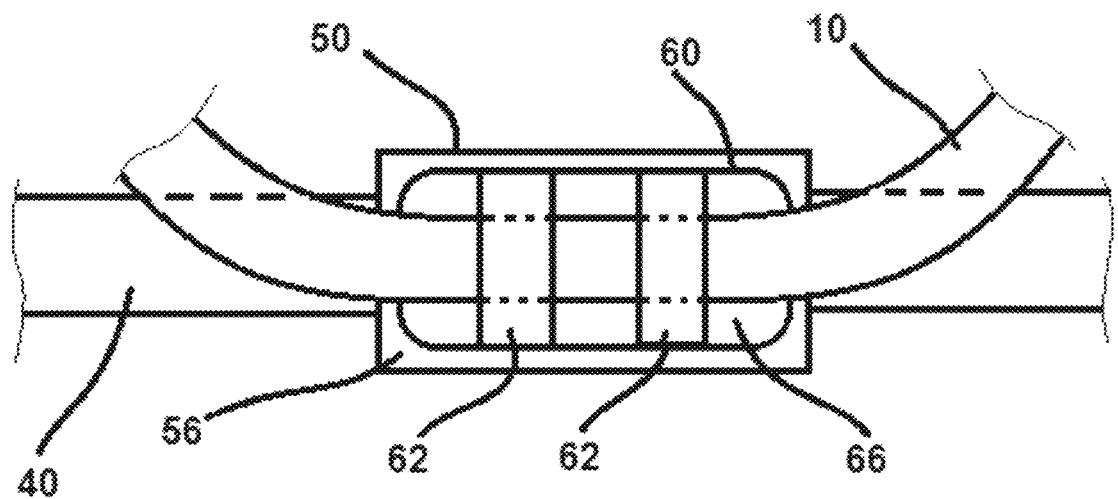
FIG. 2 is a diagrammatic illustration of a detail of components of a device and system according to an exemplary implementation of an exemplary embodiment of the disclosure.

Referring to FIG. 2, according to exemplary implementations of the embodiments of the disclosure, training system or cuff 30 comprises a base 50 and a guide 60, which can be removably attached to base 50, which facilitates removable attachment of leash 10 with respect to a front leg of pet 1.

Figure 3:
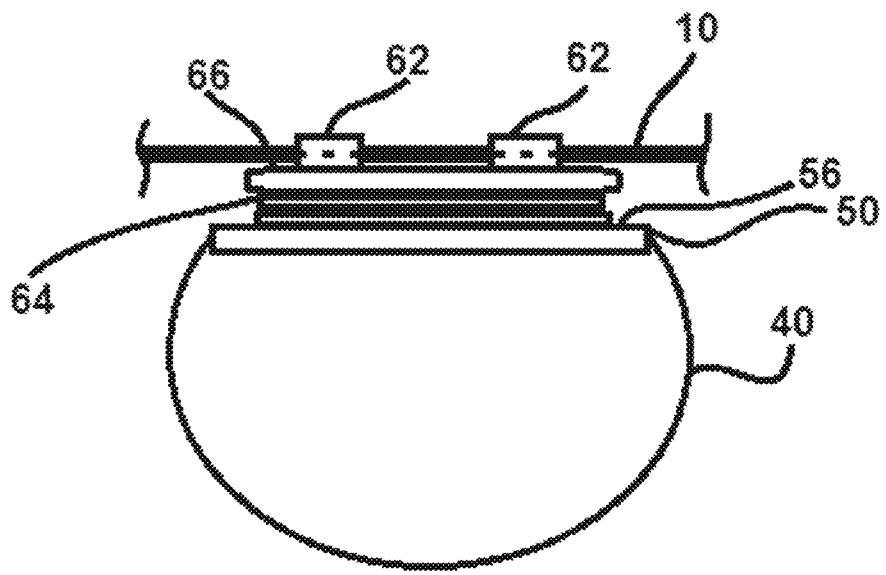
FIGS. 3 and 4 are diagrammatic illustrations of additional components of a device and system according to exemplary implementations of exemplary embodiments of the disclosure.
Figure 4:
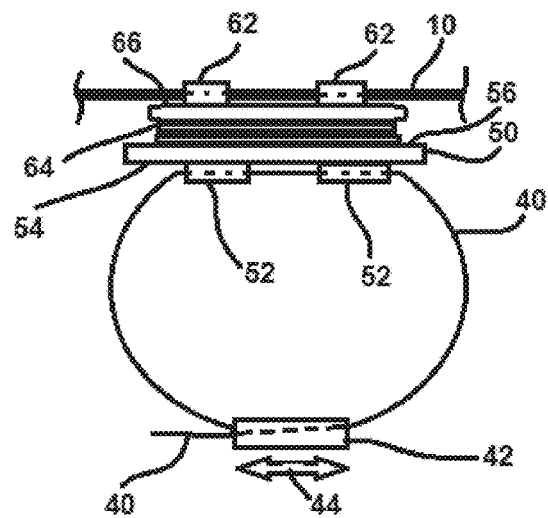

Referring to FIGS. 3 and 4, according to exemplary implementations of the embodiments of the disclosure, training system or cuff 30 comprises a leg strap 40 allowing cuff 30 to be wearable on, or configured with respect to, either left leg or right leg (as shown in FIG. 1) of pet 1.

According to exemplary implementations of the embodiments of the disclosure, base 50 can be attached to strap 40, for example by means of passing through one or more loops 52 configured (e.g., fixed) with respect to lower surface 54 of base 50. According to another exemplary implementations of the embodiments of the disclosure, base 50 can be integrally formed with, or on, strap 40, and/or guide 60 can be integrally formed with, or on, base 50.

According to exemplary implementations of the embodiments of the disclosure, strap 40 can comprise a flexible material so that it may expand and/or contract for secure attachment to a leg of pet 1. According to another exemplary implementations of the embodiments of the disclosure, strap 40 can comprise a length adjustment mechanism 42, such as a buckle, a loop, a Velcro strap, or other means, for adjusting the length of strap 40, as diagrammatically shown by arrow 44, to facilitate secure attachment of strap 40 with base 50 to a leg of pet 1. In an exemplary implementation, mechanism 42 can comprise the "break away" (release) configuration.

According to exemplary implementations of the embodiments of the disclosure, guide 60 comprises one or more loops 62, for example configured (e.g., fixed) with respect to upper surface 66 of guide 60 for passing leash 10 therethrough. In an exemplary implementations, loops 62 can be of fixed size for allowing free passage of leash 10 with respect to guide 60. According to other exemplary implementations, loops 62 can be sized to restrict, or prevent movement of leash 10 with respect to guide 60. According to yet another exemplary implementation, loops 62 can have a variable or adjustable size such that movement of leash 10 therethrough, and thereby with respect to guide 60, can be unrestricted, restricted to various degree as desired, and/or prevented, which for example can facilitate varying and/or fixing distance D (see FIG. 1) of cuff 30 with respect to collar 20, for example based on the size of pet 1, and/or the training requirements.

Referring to FIG. 1, according to an exemplary implementation, a system can further comprise a coiling cord 5 that can keep tension between the pet's collar 20 and the cuff 30. This coiling cord 5 can be attached 15 to the cuff 30, for example by a key ring, and attach 17 (107 in FIG. 10 example) to the collar 20, for example by a swivel trigger clip or similar attaching mechanism. In an exemplary implementation, a system including a coiling cord 5 can also comprise a "break away" (or a releasable) configuration 7. Such a configuration can provide "break away" (or release) feature if there is a risk of the pet pulling so hard it may injure itself, while still leaving the leash 10 connected to the collar 20 at one end with the other end of the leash 10 still in the owner's hand. While FIG. 1 illustrates a coiling cord 5, other means of creating enough tension between the collar and the cuff to keep the cuff up on the dog's leg can be used, such as a stretchable leash/belt/segment comprising an elasticized cord (e.g., a bungee).

Referring to FIG. 2, according to yet another exemplary implementation, loops 62 can be fastened using hook and loop, so the leash 10 detaches (or releases) from the cuff 30, with the leash still attached to the pet's collar 20. In addition, the cuff 30 can remain attached to the leg and to the collar 20, for example by way of a coiling configuration, such as a configuration described above with reference to an example of FIG. 1, which can be attached to the cuff 30 and run to the collar 20 to help keep enough tension between the cuff 30 and the collar 20, so that the cuff 30 stays up in a desired location, such as the "armpit," of the pet's leg.

According to exemplary implementations of the embodiments of the disclosure, guide 60 and base 50 can be fixedly connected, or integrally formed such that detachment (i.e., "break away" or "release" function) is achieved by detachment of base 50 from strap 40. According to another exemplary implementations of the embodiments of the disclosure, guide 60 can be fixedly connected, or integrally formed with strap 40, such that detachment (i.e., "break away" or "release" function) is achieved by detachment of strap 40 from leg of pet 1.

According to exemplary implementations of the embodiments of the disclosure, various configurations facilitating removable attachment of guide 60 and base 50, which provides removable attachment of leash 10 with respect to a front leg of pet 1, are possible as diagrammatically illustrate in FIGS. 5-9.

Figure 5:
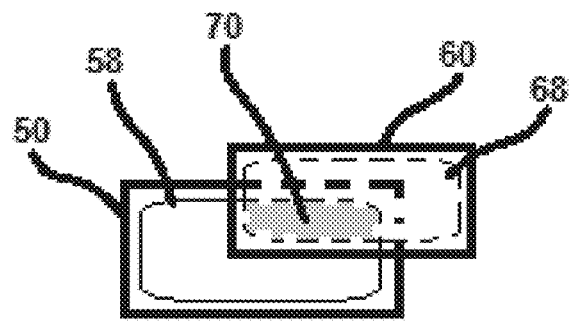
FIGS. 5 and 6 are diagrammatic illustrations of attachments of various components of a device and system according to exemplary implementations of exemplary embodiments of the disclosure.
Figure 6:
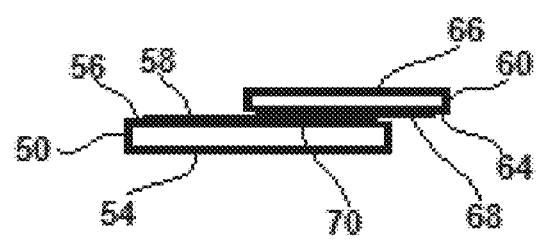

Referring to FIGS. 5 and 6, according to an exemplary implementation, complementary sticky or engaging material (such as Velcro) 58 and 68 can be attached to, otherwise disposed on, and/or made part of, upper surface 56 of base 50 and lower surface 64 of guide 66, respectively. In an exemplary implementation, varying degree of attachment can be achieved by varying the size of contact area 70 between materials 58 and 68, which can thereby provide for a desired amount of force required to detach leash 10 from leg of pet 1.

Figure 7:
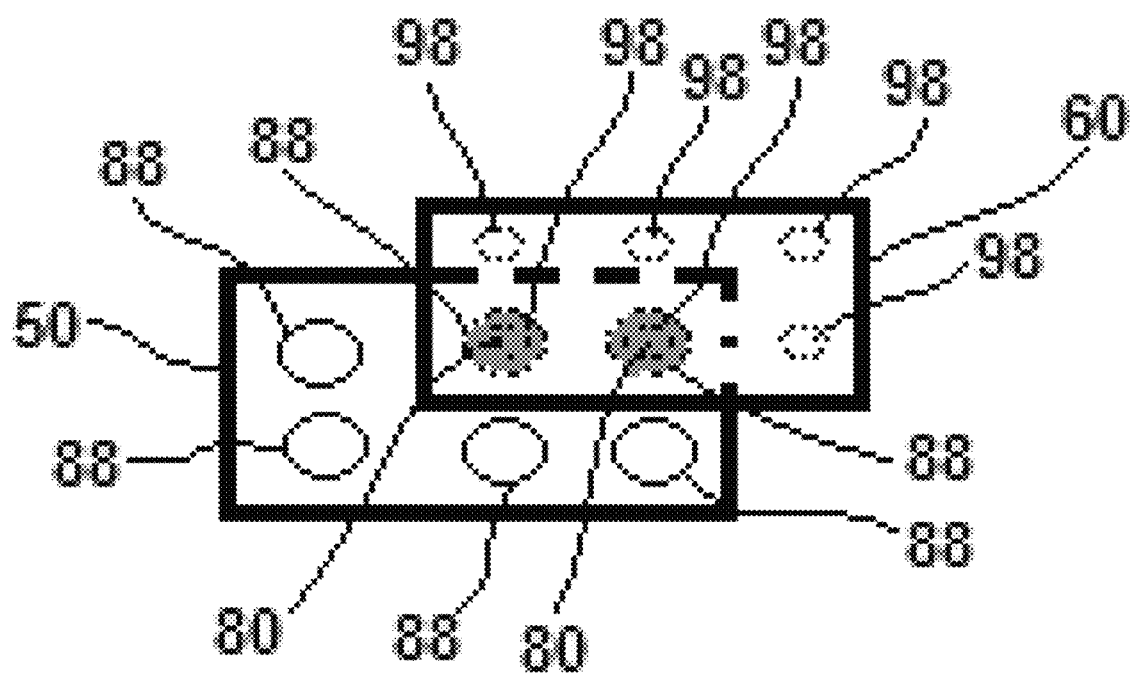
FIGS. 7, 8 and 9 are diagrammatic illustrations of various complimentary structures for devices and systems according to exemplary implementations of exemplary embodiments of the disclosure.
Figure 8:
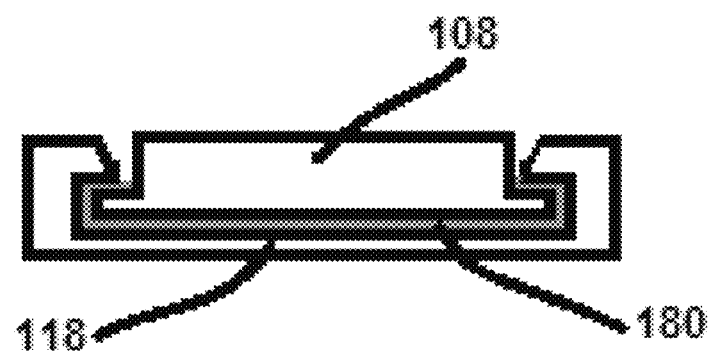
Figure 9:
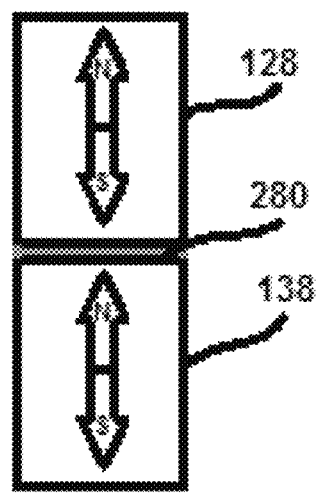

Referring to FIGS. 7-9, according to another exemplary implementation, one or more complementary structures 88 and 98 can be attached to, otherwise disposed on, and/or made part of, upper surface 56 of base 50 and lower surface 64 of guide 66, respectively. In an exemplary implementation, varying degree of attachment 80 can be achieved by varying the number of such structures used to connect base 50 and guide 60, which can thereby provide for a desired amount of force required to detach leash 10 from leg of pet 1.

As illustrated in FIG. 8, according to an exemplary implementation, one or more complementary structures 88 and 98 can be formed by one or more complementary snap-fit structures 108 and 118, whereby varying degree of attachment can be achieved by varying the number of such structures used to connect base 50 and guide 60 and/or varying resiliency of snap-fit connection 108 between one or more snap-fit structures 108 and 118.

As illustrated in FIG. 9, according to another exemplary implementation, one or more complementary structures 88 and 98 can be formed by one or more complementary magnets 128 and 138, whereby varying degree of attachment can be achieved by varying the number of such structures used to connect base 50 and guide 60 and/or by deploying magnets of varying degree of magnetism 280 between one or more magnets 128 and 138.

According to exemplary implementations of the embodiments of the disclosure, guide 60 and base 50 can be fixedly connected, or integrally formed, such that detachment (i.e., "break away" or "release" function) can be achieved by detachment of base 50 from strap 40. According to another exemplary implementations of the embodiments of the disclosure, guide 60 can be fixedly connected, or integrally formed with strap 40, with or without the use of base 50, such that detachment (i.e., "break away" or "release" function) can be achieved by detachment of strap 40 from leg of pet 1, for example by including mechanism 42 on strap 40 to facilitate detachment functionality.

Figure 10:
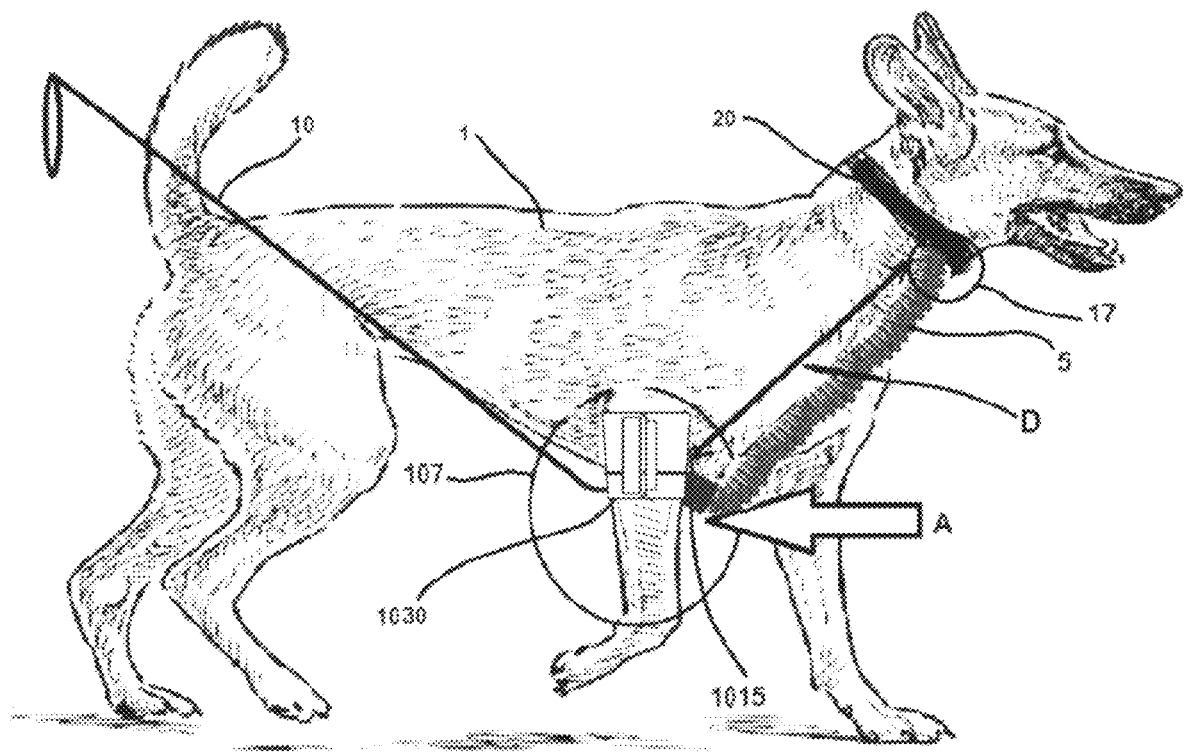
FIG. 10 is a generalized illustration of a device and system according to another exemplary embodiment of the disclosure disposed on a pet.
Figure 11:
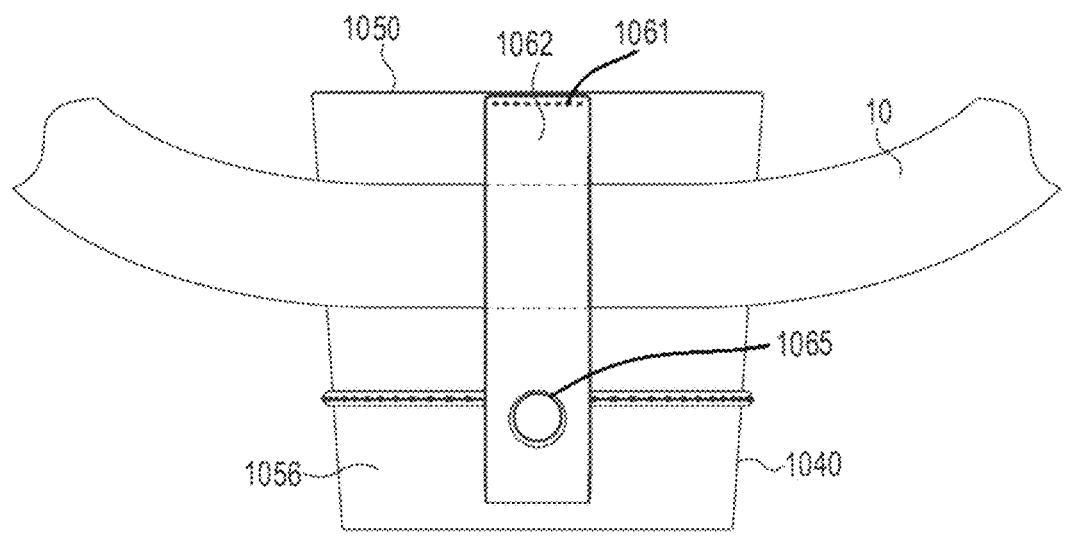
FIG. 11 is a diagrammatic illustration of a detail of components of a device and system according to an exemplary implementation of another exemplary embodiment of the disclosure.
Figure 12:
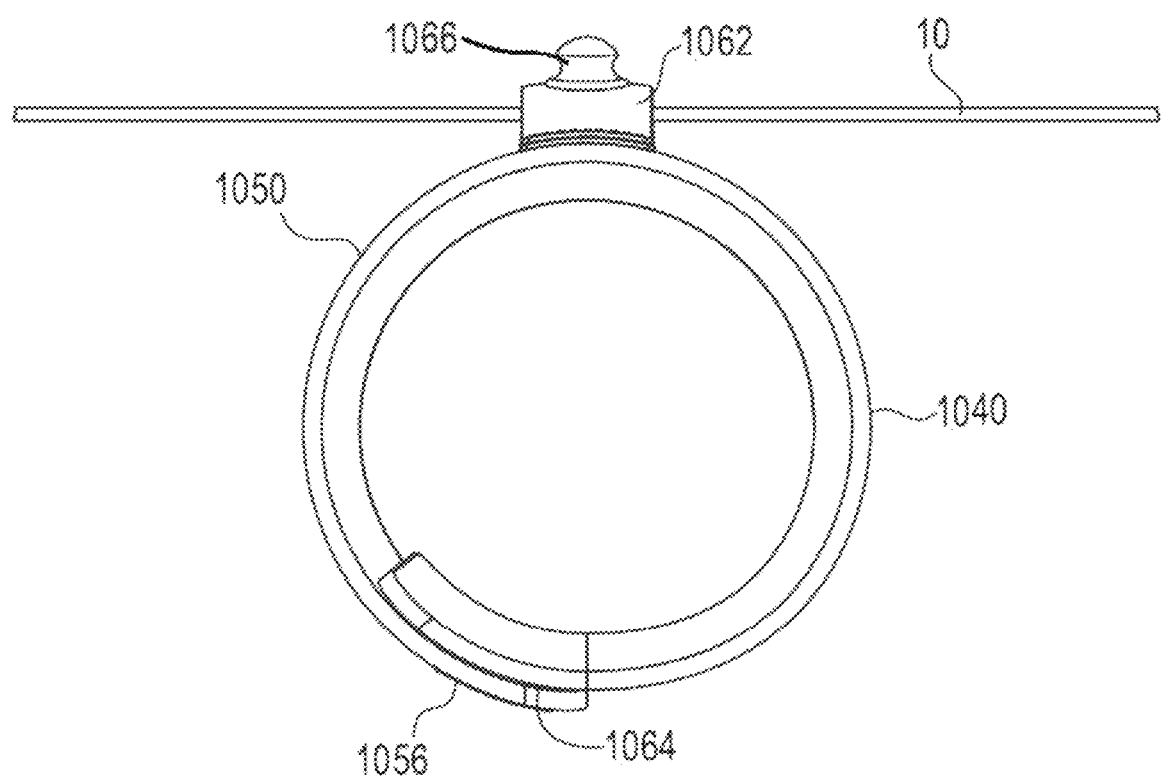
FIG. 12 is diagrammatic illustrations of additional components of a device and system according to exemplary implementations of another exemplary embodiment of the disclosure.

Referring to FIGS. 10-12, other exemplary embodiments of the present disclosure provide various other or modified devices and system that can facilitate stopping a dog from pulling its owner, and/or train a dog to not pull while being walked on a leash. In an exemplary implementation, a cuff 1030 can be wrapped around the highest point of either front leg of the dog, using, for example a hook and loop fastener and running a leash 10 through the sleeve or guide 1062, which can be implemented as an elastic loop attached on the outside of the cuff 1030, so that an existing leash 10 can be run from the collar 20, under the inside of the leg and up to the owner's hand.

Referring to FIG. 12, according to exemplary implementations of the embodiments of the disclosure, training system or cuff 1030 comprises a strap 1040 with an exterior surface 1056 and a base 1050. Strap 1040 can be removably attached with respect to a front leg of pet 1.

In an exemplary implementation, removable attachment of strap 1040 comprises a detachable configuration 1064 to facilitate the removable attachment of strap 1040 with respect to a front leg of pet 1

According to an exemplary, non-limiting implementation, elastic loop 1062 can be attached, for example fixedly and/or directly 1061, to a base 1050 of strap 1040. While a single loop 1062 maybe sufficient, two or more loops can also be used within the scope of the disclosure.

According to an exemplary, non-limiting implementation, a detachable configuration 1064, such as VELCRO® type fitment, a tear-away, or releasable, hook and loop fastener, can create a "safety valve" that releases entire strap 1040 when the strength of the dog's pull creates a risk of injury. Exemplary implementations can provide for different strengths (sizes), based on the strength (weight) of the dog and correlating directly with the strength of the hook and loop.

According to an exemplary, non-limiting implementation of a detachable configuration 1064, the ability to "break away" (release) if there is a risk of the dog pulling so hard it may injure itself, still leaves the leash connected to the collar and the other end of the leash still in the owner's hand.

Referring to FIGS. 11 and 12, according to exemplary implementations of the embodiments of the disclosure, training system or cuff 1030 comprises comprising strap 1040 allows cuff 1030 to be wearable on, or configured with respect to, either left leg or right leg (as shown in FIG. 10) of pet 1.

According to exemplary implementations of the embodiments of the disclosure, strap 1040 can comprise a flexible material so that it may expand and/or contract for secure attachment to a leg of pet 1. According to another exemplary implementations of the embodiments of the disclosure, a detachable configuration 1064 of strap 1040 can comprise a length adjustment mechanism, such as mechanism 42, which can comprise the "break away" (release) configuration.

According to exemplary implementations of the embodiments of the disclosure, loops 1062 can be of fixed size for allowing free passage of leash 10 with respect to strap 1040. According to other exemplary implementations, loop 1062 can be sized to restrict, or prevent movement of leash 10 with respect to strap 1040. According to yet another exemplary implementation, loop 1062 can have a variable or adjustable size such that movement of leash 10 therethrough, and thereby with respect to strap 1040, can be unrestricted, restricted to various degree as desired, and/or prevented, which for example can facilitate varying and/or fixing distance D (see FIG. 10) of cuff 1030 with respect to collar 20, for example based on the size of pet 1, and/or the training requirements.

According to yet another exemplary implementation of the disclosure, cuff 1030 can comprise a protrusion 1065 configured to make contact with body of pet 1, preferably at an area between the leg and body of pet 1. In an exemplary implementation protrusion 1065 can comprise a base 1066 attached to loop 1062 as shown in FIG. 12. In yet further exemplary implementation, protrusion 1065 comprises a smooth, for example rounded, outer surface, as further illustrated in the example of FIG. 12. Protrusion 1065 is configured with respect to cuff 1030 such that it can apply gentle pressure to body of pet 1, which pressure can be of varying strength, as leash 10 is pulled with respect to collar 20.

According to exemplary implementations, loop 1062 that the leash 10 goes through is only one loop, that is made of elastic, and attached at the top 1050 of the cuff 1032 only, so as to allow the leash 10 to come up under the armpit of pet 1 and cause pet 1 to stop pulling. Protrusion 1065, which can be called a "leverage neutralizer," can comprise a little hard rubber or plastic nub (for example, about 2 to 4 inches tall) attached for example to the bottom of the elastic loop 1052 (see FIGS. 11 and 12). This protrusion 1065 gently pushes up into the armpit of pet 1 to cause pet 1 to feel like it is losing balance/leverage and stop pulling, for example more than if it's just the leash 10 pulling up into the armpit of pet 1.

While the disclosure has been shown and described with reference to a certain exemplary embodiment thereof, it will be understood by those skilled in the art that various changes in form and details may be made therein without departing from the spirit and scope of the disclosure as defined by the appended representative claims and the full scope of equivalents thereof.

I claim:

1. A training device comprising:
a strap attachable to a front leg of a pet; and
a guide configured with respect to the strap and the front leg of the pet for passing therethrough a leash attached to a collar worn by the pet, whereby the leash is within the guide disposed between a handle of the leash and the collar, and the strap is removably attached to the front leg of the pet,
wherein the strap achieves detachment from the leg of the pet when force between the handle of the leash and the collar exceeds a predetermined amount.

2. The device of claim 1, wherein the strap comprises a releasable fastener to facilitate said detachment of said strap from the leg of the pet.

3. The device of claim 1, wherein said strap further comprises a base and the guide is fixedly attached to said base.

4. The device of claim 1, wherein said predetermined amount of force is set based on at least one of the size and weight of the pet.

5. The device of claim 1, further comprising a protrusion disposed with respect to at least one of said strap and said guide configured to apply pressure to a body of said pet proportional to said force between the handle of the leash and the collar.

6. The device of claim 1, wherein said protrusion is disposed on said guide such that, when said strap is configure on said front leg of said pet, said protrusion is between said front leg and said body of said pet.

7. The device of claim 3, wherein said guide comprises a loop attached to said base of said strap such that, when said strap is configure on said front leg of said pet, said loop is between said front leg and said body of said pet.

8. The device of claim 7, wherein said loop is flexible.

9. The device of claim 5, wherein
said guide comprises a loop attached to said strap such that, when said strap is configure on said front leg of said pet, said loop is between said front leg and said body of said pet, and
said protrusion is disposed on said loop.

* * * * *